US008548522B2

(12) United States Patent
Karaoguz

(10) Patent No.: US 8,548,522 B2
(45) Date of Patent: *Oct. 1, 2013

(54) SINGLE CHIP MULTIMODE BASEBAND PROCESSING CIRCUITRY WITH A SHARED RADIO INTERFACE

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,368

(22) Filed: Aug. 2, 2012

(65) Prior Publication Data

US 2012/0295658 A1    Nov. 22, 2012

Related U.S. Application Data

(63) Continuation of application No. 12/829,016, filed on Jul. 1, 2010, now Pat. No. 8,271,029, which is a continuation of application No. 11/217,834, filed on Sep. 1, 2005, now Pat. No. 7,751,850.

(51) Int. Cl.
*H04M 1/00* (2006.01)
(52) U.S. Cl.
USPC ............ 455/553.1; 455/552.1; 455/63.1; 455/67.11; 455/557; 455/418; 455/420; 455/507; 455/509; 455/512; 455/513; 455/515; 710/107; 710/109; 710/113; 710/117
(58) Field of Classification Search
USPC ............ 455/445, 11.1, 41.2, 507–516, 63.1, 455/67.11, 67.13, 552.1, 553.1, 557, 561, 455/556.1, 556.2, 418–420; 710/107–117
See application file for complete search history.

(56) References Cited

U.S. PATENT DOCUMENTS

| 3,886,524 | A  | * | 5/1975  | Appelt      | 710/110 |
|-----------|----|---|---------|-------------|---------|
| 5,428,602 | A  | * | 6/1995  | Kemppainen  | 370/330 |
| 6,240,478 | B1 | * | 5/2001  | Brickell    | 710/110 |
| 6,671,758 | B1 | * | 12/2003 | Cam et al.  | 710/100 |
| 6,788,729 | B1 | * | 9/2004  | Posti       | 375/133 |

(Continued)

FOREIGN PATENT DOCUMENTS

| CN | 1642329 | 7/2005 |
| CN | 1642332 | 7/2005 |

(Continued)

OTHER PUBLICATIONS

European Patent Office, Communication with European Search Report, in Application No. 06011875.9, dated Nov. 24, 2010.

(Continued)

*Primary Examiner* — Tuan A Tran
(74) *Attorney, Agent, or Firm* — Brinks Hofer Gilson & Lione

(57) ABSTRACT

A multimode communication integrated circuit comprising baseband processing circuitry with a shared radio interface. Various aspects of the present invention may comprise a processor module adapted to perform various processing (e.g., baseband processing) in support of multimode communications. A first radio module may be communicatively coupled to the processor module through a common communication interface. A second radio module may also be communicatively coupled to the processor module through the common communication interface. The common communication interface may, for example, be adapted to communicate information over a communication bus that is shared between the processor module and a plurality of radio modules (e.g., the first and second radio modules).

20 Claims, 4 Drawing Sheets

(56) References Cited

U.S. PATENT DOCUMENTS

| | | | |
|---|---|---|---|
| 6,882,843 B1* | 4/2005 | Comer | 455/445 |
| 7,184,466 B1* | 2/2007 | Seemann et al. | 375/219 |
| 7,190,974 B2* | 3/2007 | Efland et al. | 455/562.1 |
| 7,751,850 B2* | 7/2010 | Karaoguz | 455/553.1 |
| 2002/0009983 A1* | 1/2002 | Pritchett et al. | 455/260 |
| 2003/0036408 A1* | 2/2003 | Johansson et al. | 455/560 |
| 2003/0215019 A1 | 11/2003 | Iganami | |
| 2004/0166823 A1 | 8/2004 | Alderton | |
| 2010/0267417 A1 | 10/2010 | Karaoguz | |

FOREIGN PATENT DOCUMENTS

| | | |
|---|---|---|
| EP | 1187353 A2 | 3/2002 |
| WO | WO 97/08843 A2 | 3/1997 |
| WO | WO 02/067450 A2 | 8/2002 |
| WO | WO 03/061174 A2 | 7/2003 |
| WO | WO 2004/030228 A2 | 4/2004 |

OTHER PUBLICATIONS

Fogg, A: "DigRF Baseband/RF Digital Interface Specification," Internet Citation, Feb. 20, 2004, XP00232571 0, Retrieved from the Internet: URL:http://146.101.169 .51/DigRF%20Standard%20v112.pdf, retrieved on Feb. 20, 2004.

Springer, A. et al., "RF System Concepts for Highly Integrated FRICs for W-CDMA Mobile Radio Terminals," IEEE Transactions on Microwave Theory and Techniques, IEEE Service Center, Piscataway, NJ, US, vol. 50, No. 1, Jan. 1, 2002, XP011 038597 ISN: 0018-9480.

Krenik, W., et al. "Cellular Handset Integration—SIP vs. SOC", Custom Integrated Circuits Conference, 2004, Proceedings of the IEEE 2004, IEEE, Piscataway, NJ, USA LNKD-OI:10.1109/CICC.2004.1358737, Oct. 3, 2004, pp. 63-70, XP010742231, ISBN: 978-0-7803-8495-8.

* cited by examiner

SINGLE CHIP MULTIMODE BASEBAND PROCESSING CIRCUITRY WITH A SHARED RADIO INTERFACE

CROSS REFERENCE TO RELATED APPLICATIONS

This application is a continuation of U.S. application Ser. No. 12/829,016, filed Jul. 1, 2010, pending, which is a continuation of U.S. application Ser. No. 11/217,834, Sep. 1, 2005, issued as U.S. Pat. No. 7,751,850 on Jul. 6, 2010, all of which applications are hereby incorporated herein in their entirety by this reference.

BACKGROUND

Mobile communication devices are continually increasing in popularity. Such mobile communication devices include, for example and without limitation, cellular phones, paging devices, portable email devices, and personal digital assistants. Mobile communication devices provide the user with the capability to conduct communications while moving through a variety of environments.

Mobile communication devices may operate in accordance with multiple communication modes. For example a mobile communication device may be adapted to operate in a cellular communication mode and a wireless computer network communication mode. Such multimode mobile communication devices may have respective communication configurations for each communication mode. For example, various communication modes may correspond to different respective radios.

As the number of radios in a multimode communication device increases, communication interface circuitry between processing circuitry (e.g., a baseband processor) and the number of radios may become increasingly complex and/or costly. Further limitations and disadvantages of conventional and traditional approaches will become apparent to one of skill in the art, through comparison of such systems with the present invention as set forth in the remainder of the present application with reference to the drawings.

SUMMARY

Various aspects of the present invention provide a multimode communication integrated circuit comprising baseband processing circuitry with a shared radio interface, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
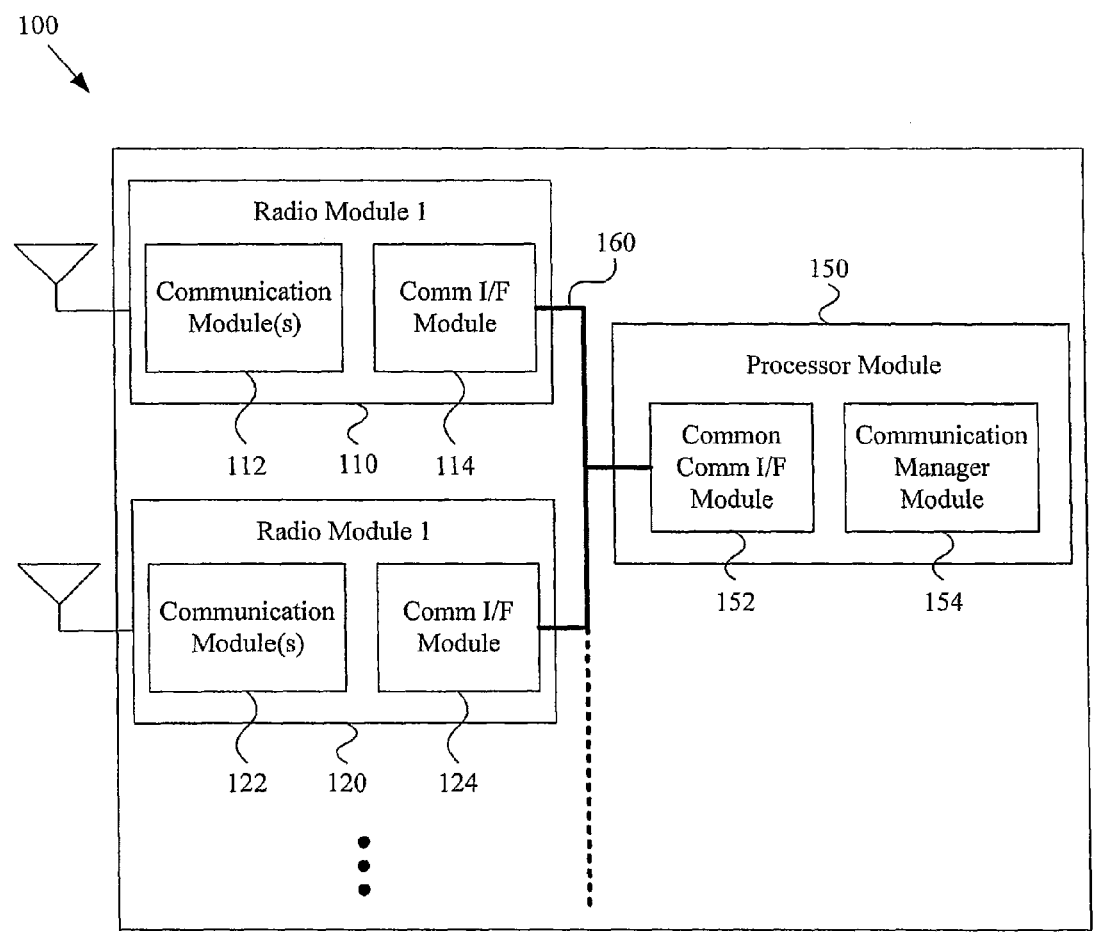
FIG. 1 is a diagram illustrating a portion of a multimode communication integrated circuit, in accordance with various aspects of the present invention.

FIG. 1 is a diagram illustrating a portion of a multimode communication integrated circuit 100, in accordance with various aspects of the present invention. The multimode communication integrated circuit 100 may, for example, be implemented in a single chip utilizing CMOS technology or utilizing other chip fabrication technologies.

The multimode communication integrated circuit 100 may, for example, be utilized in any of a variety of communication devices. For example, the integrated circuit 100 may be utilized in a mobile or fixed communication system or device. Also for example, the integrated circuit 100 may be utilized in any of a variety of communication devices comprising multimode communication capability.

For example and without limitation, the exemplary integrated circuit 100 may be utilized in a mobile communication device (e.g., a cellular telephone, pager, portable email device, portable computer, personal digital assistant, portable television, portable radio, etc.). Also for example, the exemplary integrated circuit 100 may be utilized in a fixed communication device (e.g., a cellular base station, a satellite, a wireless router, a set top box, a portable phone base station, a television station, etc.). Accordingly, the scope of various aspects of the present invention should not be limited by characteristics of any particular type of communication device that may utilize the exemplary integrated circuit 100.

The exemplary integrated circuit 100 may comprise a plurality of radio modules. In the non-limiting exemplary illustration of FIG. 1, the integrated circuit 100 comprises at least a first radio module 110 and a second radio module 120. The following discussion will generally refer to only two radio modules for illustrative clarity. Note, however, that the scope of various aspects of the present invention should not be limited to any particular number of radio modules.

The first radio module 110 may comprise a communication module 112. The communication module 112 may, for example, be adapted to establish and communicate over a first communication link (e.g., an RF communication link) associated with a particular first communication mode of a multimode communication device. For example and without limitation, such a first communication mode may comprise characteristics of any of a cellular telephone communication mode (e.g., GSM/GPRS/EDGE, CDMA/WCDMA, TDMA/PDC, etc.), television communication mode (e.g., DVB-H), direct peer-to-peer communication mode, any of a variety of computer (or data) network communication modes, etc. Examples of various computer network communication modes may, for example, comprise any of a variety of Wireless Local Area Network (WLAN) communication modes, Wireless Personal Area Network (WPAN) communication modes, Wireless Metropolitan Area Network ("WMAN") communication modes, etc. For example, such a computer network communication mode may comprise characteristics of an IEEE 802.11 communication mode, a Bluetooth communication mode, any WiFi communication mode, an IEEE 802.15 communication mode, an Ultra Wideband ("UWB") communication mode, etc.

Similarly, the second radio module 120 may comprise a communication module 122. The communication module 122 may, for example, be adapted to establish and communication over a second communication link (e.g., an RF communication link) associated with a particular second communication mode of a multimode communication device. Such a second communication mode may, for example and without limitation, comprise characteristics of any of the communication modes discussed previously with regard to the first radio module 120.

The first radio module 110 may comprise a communication interface module 114, which may be adapted to communicate information with other modules (e.g., a baseband processing module). Similarly, the second radio module 120 may comprise a communication interface module 124, which may be adapted to communicate information with other modules (e.g., a baseband processing module). Various characteristics of the respective communication interface modules 114, 124 of the first and second radio modules 110, 120 will be discussed in more detail later.

The exemplary integrated circuit 100 may comprise one or more processor modules 150. The processor module 150 may, for example and without limitation, comprise characteristics of a baseband processor adapted to support multimode communication utilizing a plurality of radios.

The processor module 150 may, for example, comprise one or more communication manager modules 154. The communication manager module 154 may, for example, be adapted to manage (e.g., at a relatively high level) multimode communications through a plurality of radios (or radio modules). The communication manager module 154 may, for example, comprise a common communication manager module that manages multimode communications through a plurality of radios. Alternatively, for example, the communication manager module 154 may comprise a plurality of communication manager submodules that are each dedicated to a respective mode of multimode communication.

The communication manager module 154 may, for example, generally manage the flow of information (e.g., at a relatively high level) to and from various components of the integrated circuit 100. As mentioned previously, the exemplary integrated circuit 100 may comprise a first radio module 110 and a second radio module 120. In such an exemplary scenario, communication, configuration or operational information may flow between the processor module 150 and the first and second radio modules 110, 120. The communication manager module 154 may generally manage the high level flow of such information.

The communication manager module 154 may, for example, be adapted to perform in any of a variety of communication integrated circuit configurations. For example, the communication manager module 154 may be programmable. In a non-limiting exemplary scenario, the communication manager module 154 may be utilized in a first communication IC to manage communication with a first set of radios communicating in a first set of communication modes, and the same communication manager module 154 (or hardware aspects thereof) may be utilized in a second communication IC to manage communication with a second set of radios communicating in a second set of communication modes. In such an exemplary scenario, there might, for example, be only a software/firmware difference between the respective communication manager module(s) 154 in the two communication ICs.

Such flexibility may advantageously provide for utilization of the processor module 150 (e.g., the communication manager module 154) in any of a variety of communication IC configurations. As will be discussed below, the common communication interface 152 of the processor module(s) 150 may also, for example, provide for the utilization of the processor module 150 in any of a variety of communication IC configurations.

The processor module 150 may also comprise a common communication interface module 152 that is adapted to communicate with a plurality of radios (e.g., the first radio module 110 and the second radio module 120) through a common (or shared) interface. The common communication interface module 152 may comprise any of a variety of common (or shared) interface characteristics.

For example, the common communication interface module 152 ("comm I/F module 152") may be adapted to communicate with a plurality of radio modules (e.g., the first radio module 110 and the second radio module 120) over a common communication bus 160. For example, the comm I/F module 152 may be adapted to communicate with the first radio module 110 over the communication bus 160 and with the second radio module 120 over the same communication bus 160 (e.g., serially or concurrently). In other words, the first radio module 110 and the second radio module 120 may be communicatively coupled to the processor module 150 through the comm I/F module 152 over a single communication bus. Note that the term "communicate" may generally apply to receiving and/or transmitting information.

The common communication bus 160 may comprise characteristics of any of a variety of communication bus types. For example and without limitation, the common communication bus 160 may comprise characteristics of a serial or parallel bus. In a non-limiting exemplary scenario, the common communication bus 160 may correspond to a single-conductor serial bus. In another non-limiting exemplary scenario, the common communication bus 160 may correspond to a multi-trace parallel bus.

The common communication bus 160 may comprise characteristics of any of a variety of communication media. For example and without limitation, the common communication bus 160 may comprise characteristics of a wired bus. Also for example, the common communication bus 160 may comprise characteristics of an optical or RF bus.

The common communication bus 160 may comprise characteristics of any of a variety of communication bus architectures. For example and without limitation, the common communication bus 160 may comprise characteristics of a tree bus, star bus or a ring bus. The common communication bus 160 may, for example, be characterized by a relatively common architecture or, alternatively, by characteristics customized to a particular type of communication (e.g., communication of information typically communicated between a baseband processor and a radio).

As will be discussed below, communication over the common communication bus 160 may be governed by any of a variety of communication protocols (e.g., standard, common or propriety). Such a communication protocol may, for example, comprise characteristics of a relatively common protocol or, alternatively, of a communication protocol customized to a particular type of communication (e.g., communication of information typically communicated between a baseband processor and a radio).

In general, the communication bus 160 may comprise characteristics of any of a variety of communication bus types. Accordingly, the scope of various aspects of the present invention should not be limited by characteristics of any particular communication bus architecture, protocol or medium.

The comm I/F module 152 may be adapted to communicate any of a variety of types of information with one or more radio modules. For example and without limitation, such information may comprise information to be transmitted by a radio module or information that was received by a radio module. Also for example, such information may comprise radio configuration or operational information.

In a non-limiting exemplary scenario, the processor module 150 may be adapted to communicate first communication information through the comm I/F module 152 to the first radio module 110 (e.g., for transmission over a first wireless communication link) and second communication information through the comm I/F module 152 to the second radio module 120 (e.g., for transmission over a second wireless communication link simultaneously with communication of the first communication information over the first wireless communication link).

In another non-limiting exemplary scenario, the processor module 150 may be adapted to communicate various Media Access Control ("MAC") layer information through the comm I/F module 152 with the first radio module 110 and the second radio module 120. Such MAC layer information may, for example and without limitation, comprise power level management information, scanning information, authentication information, secure communication information, sleep mode information, packet fragmentation information, etc.

In yet another non-limiting exemplary scenario, the processor module 150 may be adapted to communicate various Physical ("PHY") layer and/or Data Link layer information through the comm I/F module 152 with the first radio module 110 and the second radio module 120. Such PHY layer or Data Link layer information may, for example and without limitation, comprise carrier sense information, packet or frame communication information, data unit information, frequency information, modulation/demodulation information, encoding/decoding information, etc.

In still another non-limiting exemplary scenario, the processor module 150 may be adapted to communicate various radio component setting information through the comm I/F module 152 with the first radio module 110 and the second radio module 120. Such radio component setting information may, for example and without limitation, comprise filter settings, tuner settings, codec settings, PAL information, etc.

In another non-limiting exemplary scenario, the processor module 150 may be adapted to communicate various high-level communication layer information through the comm I/F module 152 with the first radio module 110 and the second radio module 120. For example and without limitation, such information may comprise transport layer information, session layer information, application layer information, etc.

In another non-limiting exemplary scenario, the processor module 150 may be adapted to communicate various executable instruction information through the comm I/F module 152 with the first radio module 110 and the second radio module 120. Such executable instruction information may, for example, comprise characteristics of any of a variety of types of executable instructions that might be executed during the communication of information by a radio.

Further for example, the processor module 150 may be adapted to communicate various multimode coordination information through the comm I/F module 152 with the first radio module 110 and the second radio module 120. Such multimode coordination information may, for example, be designed to operate the first radio module 110 in a first communication mode and the second radio module 120 in a second communication mode without interfering with each other (or with a minimal amount of interference).

In general, the processor module 150 may be adapted to communicate any of a variety of communication, configuration and/or operational information through the comm I/F module 152 with the first and second radio modules 110, 120. Accordingly, the scope of various aspects of the present invention should not be limited by characteristics of any particular type of information that may be communicated through the comm I/F module 152.

The comm I/F module 152 may be adapted to communicate information between the processor module 150 and the first and second radio modules 110, 120 through a common communication interface (e.g., over a shared communication bus) in any of a variety of manners. Additionally, the respective comm I/F modules 114, 124 of the first and second radio modules 110, 120 may similarly be adapted to be compatible with the comm I/F module 152.

For example and without limitation, the comm I/F module 152 (and similarly, the respective comm I/F modules 114, 124 of the first and second radio modules 110, 120) may be adapted to conduct synchronous communications between the processor module 150 and the first and second radio modules 110, 120 over the shared communication bus 160. For example and without limitation, the comm I/F module 152 may be adapted to communicate with the first and second radio modules 110, 120 utilizing a polling technique. For example, the comm I/F module 152 may be adapted to initiate communication with the first and second radio modules 110, 120 by communicating a poll message directed to whichever of the first and second radio modules 110, 120 (or both) that the comm I/F module 152 is to communicate with.

Also for example, the comm I/F module 152 may be adapted to communicate with the first and second radio modules 110, 120 utilizing allocated channel space. Such allocated channel space may, for example, comprise a frequency, timeslot, code, hopping sequence, etc. As will be discussed later, such allocated channel space may, for example, be allocated at IC design or production time or may be allocated in real-time in response to real-time operating conditions. Further for example, the comm I/F module 152 may be adapted to communicate with the first and second radio modules utilizing various token-based techniques.

Also for example and without limitation, the comm I/F module 152 (and similarly, the respective comm I/F modules 114, 124 of the first and second radio modules 110, 120) may be adapted to conduct asynchronous communications between the processor module 150 and the first and second radio modules 110, 120 over the common communication bus 160. For example and without limitation, the comm I/F module 152 may be adapted to communicate over the common communication bus 160 utilizing an ALOHA, CSMA or CSMA/CD medium access protocol. Also for example, the comm I/F module 152 may be adapted to communicate addressable data packets over the common communication bus 160. For example, the first and second radio modules 110, 120 and the processor module 150 (or comm I/F module 152) may comprise respective addresses to which data packets may be sent.

As discussed above, the comm I/F module 152 may be adapted to communicate information with the first radio module 110 and the second radio module 120 through a common communication interface (e.g., over a shared communication bus) in any of a variety of manners. Also as mentioned previously, in various scenarios including the communication of information between the comm I/F module 152 and the first and second radio modules 110, 120, the respective comm I/F modules 114, 124 of the first and second radio modules 110, 120 may, of course, be adapted to be generally compatible with the comm I/F module 152. For example, in an exemplary scenario where the comm I/F module 152 is adapted to conduct asynchronous packet communication with the first and second radio modules 110, 120, the respective comm I/F modules 114, 124 of the first and second radio modules 110, 120 may generally be adapted to be compatible with such communication. Note that such communication may be unidirectional or multidirectional.

Additionally, the respective comm I/F modules 114, 124 of the first and second radio modules 110, 120 may be adapted to communicate with each other (e.g., over the common communication bus 160). In a non-limiting exemplary scenario, the first and second radio modules 110, 120 may utilize their respective comm I/F modules 114, 124 to share transmission coordination information or other information that may enhance the capabilities of the first and second radio modules 110, 120.

As briefly mentioned previously, when communicating information between the processor module 150 and the first and second radio modules 110, 120 through the comm I/F module 152, communication bandwidth may, for example, be pre-allocated, allocated in real-time or utilized as needed. In a first non-limiting exemplary scenario, bandwidth for communicating through the comm I/F module 152 (e.g., over the common communication bus 160) may be pre-allocated (e.g., during IC design and/or production). For example and without limitation, the first radio module 110 may always be associated with a first channel, and the second radio module 120 may always be associated with a second channel.

In a second non-limiting exemplary scenario, the processor module 150 and the first and second radio modules 110, 120 may utilize communication bandwidth as needed (e.g., whenever a communication channel is available). For example, when one of the first radio module 110, second radio module 120 and processor module 150 desires to communicate, such module may acquire control over at least a portion of available communication bandwidth (e.g., a channel) and utilize such acquired bandwidth to conduct the desired communication.

In a third non-limiting exemplary scenario, the processor module 150 (e.g., the communication manager module 154) may be adapted to allocate communication bandwidth for communication with the first and second radio modules 110, 120. For example, the first radio module 110 may be presently communicating a cellular telephone call, while the second radio module 120 may be communicating email information in the background. In such an exemplary scenario, the processor module 150 may allocate a relatively large amount of communication bandwidth through the comm I/F module 152 (e.g., over the common communication bus 160) to the first radio module 110 and a relatively small amount of communication bandwidth to the second radio module 120.

The processor module 150 (e.g., the communication manager module 154) may base such bandwidth allocation on any of a variety of criteria. For example and without limitation, the processor module 150 may be adapted to allocate bandwidth through the comm I/F module 152 (e.g., over the common communication bus 160) based, at least in part, on priority between the first and second radio modules 110, 120 (e.g., cellular telephone operation, when being conducted, might correspond to a higher priority than email communication or wireless LAN communication).

Also for example, the processor module 150 may be adapted to allocate bandwidth through the comm I/F module 152 (e.g., over the common communication bus 160) based, at least in part, on Quality of Service ("QoS") goals. For example, the processor module 150 may allocate bandwidth through the comm I/F module 152 based, at least in part, on a goal of meeting minimum QoS goals for communication services being provided by the first and/or second radio modules 110, 120.

Further for example, the processor module(s) 150 may be adapted to allocate bandwidth through the comm I/F module 152 (e.g., over the common communication bus 160) based, at least in part, on a bandwidth allocation profile. For example, a bandwidth allocation profile may comprise information indicative of where a user (or other communication system) desires bandwidth to be allocated.

In general, the processor module 150 (e.g., the communication manager module 154 and/or the comm I/F module 152) may be adapted to allocate bandwidth for communication through the comm I/F module 152 (e.g., over a shared communication bus). Accordingly, the scope of various aspects of the present invention should not be limited by any particular manner of allocating communication bandwidth.

The comm I/F module 152 may, as mentioned previously, comprise characteristics associated with generally known or standard bus types and/or proprietary or customized bus types. For example and without limitation, the comm I/F module 152 (and the respective comm I/F modules 114, 124 of the first and second radio modules 110, 120) may comprise characteristics of a communication interface specifically adapted to communicate information between a processor module (e.g., a baseband processor) and a radio module. For example, the comm I/F module 152 may utilize a communication protocol comprising data definitions, arrangements and values specifically adapted to efficiently communicate radio-related information. Also for example, such an exemplary communication protocol may comprise efficient mechanisms for communication bus access in the radio communication environment. For example and without limitation, such an exemplary communication protocol may provide for varying packet size, prioritized media access, etc.

The exemplary multimode communication integrated circuit 100 was presented to provide specific illustrations of various generally broader aspects of the present invention. Accordingly, the scope of various aspects of the present invention should not be limited by characteristics of the exemplary IC 100.

Figure 2:
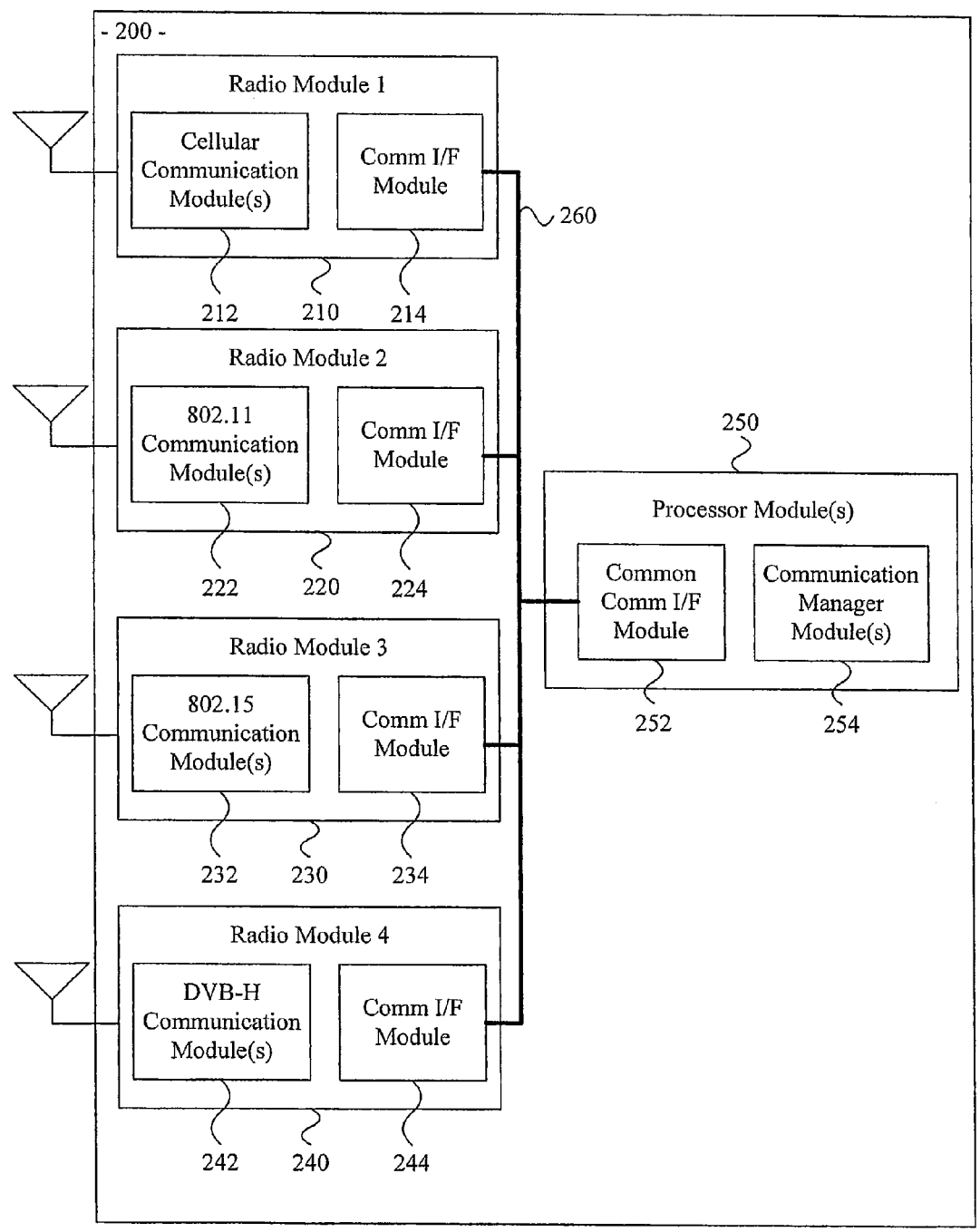
FIG. 2 is a diagram illustrating a portion of a multimode communication integrated circuit, in accordance with various aspects of the present invention.

FIG. 2 is a diagram illustrating a portion of a multimode communication integrated circuit 200, in accordance with various aspects of the present invention. The multimode communication integrated circuit 200 may, for example and without limitation, share various characteristics with the exemplary multimode communication integrated circuit 200 illustrated in FIG. 1 and discussed previously.

The exemplary integrated circuit 200 may comprise a processor module 250. The processor module 250 may, for example and without limitation, share various characteristics with the processor module(s) 150 of the exemplary integrated circuit 100 illustrated in FIG. 1 and discussed previously. For example the processor module 250 may comprise a communication manager module 254 and a common communication interface module 252.

The communication manager module 254 may, for example and without limitation, share various characteristics with the communication manager module(s) 154 of the exemplary IC 100 illustrated in FIG. 1 and discussed previously. For example, the communication manager module 254 may be adapted to generally manage the flow of communication, configuration and/or operational information to and from various radio modules.

In a non-limiting exemplary scenario, the communication manager module 254 may be adapted to generally manage (e.g., at a relatively high level) the communication of information with the first radio module 210, second radio module 220, third radio module 230 and fourth radio module 240. In the non-limiting exemplary scenario, the first radio module 210 may be associated with a first communication mode (e.g., a cellular communication mode), the second radio module 220 may be associated with a second communication mode (e.g., a IEEE 802.11 communication mode), the third radio module 230 may be associated with a third communication mode (e.g., a IEEE 802.15 communication mode), and the fourth radio module 240 may be associated with a fourth communication mode (e.g., a DVB-H communication mode). The communication manager module 254 may be adapted to generally manage the communication of information (e.g., at a relatively high level) with the various radio modules 210, 220, 230 and 240 in support of their respective communication modes.

The common communication interface module 252 ("comm I/F module 252") may, for example and without limitation, share various characteristics with the comm I/F module 152 of the exemplary system 100 illustrated in FIG. 1 and discussed previously. For example, the comm I/F module 252 may be adapted to communicate with a plurality of radios (e.g., the first radio module 210, the second radio module 220, the third radio module 230 and the fourth radio module 240) over a common (or shared) interface.

For example, the comm I/F module 252 may be adapted to communicate with the radio modules 210, 220, 230 and 240 over a common communication bus 260. The common communication bus 260 may, for example and without limitation, share various characteristics with the common communication bus 160 of the integrated circuit 100 illustrated in FIG. 1 and discussed previously. For example and without limitation, the common communication bus 260 may comprise characteristics of any of a variety of communication bus types, utilize any of a variety of communication media, comprise characteristics of any of a variety of communication bus architectures, and be associated with any of a variety of communication protocols.

Also for example, the comm I/F module 252 may be adapted to communicate any of a variety of types of information with any, any combination of or all of the radio modules 210, 220, 230 and 240. For example, such information may comprise communication information, configuration information and/or operational control information.

Further for example, the comm I/F module 252 may be adapted to communicate information with the first radio module 210, second radio module 220, third radio module 230 and fourth radio module 240 through a common communication interface (e.g., over a shared communication bus) in any of a variety of manners. For example and without limitation, the comm I/F module 252 may be adapted to synchronously or asynchronously communicate information with the radio modules 210, 220, 230 and 240.

Note that the respective comm I/F modules 214, 224, 234 and 244 of the radio modules 210, 220, 230 and 240 may be generally adapted to be compatible with the comm I/F module 252. Also for example and without limitation, the respective comm I/F modules 214, 224, 234 and 244 may be adapted to communicate various types of information with each other (e.g., bandwidth allocation information, interoperability information, various transmission coordination information, etc.).

Also for example, as discussed previously with regard to the exemplary IC 100 illustrated in FIG. 1, communication bandwidth may be allocated for communication through the comm I/F module 252 in any of a variety of manners. For example, such bandwidth allocation may be predetermined or may change in response to real-time conditions. Also for example, such bandwidth allocation may be based on priority, QoS, profile information, etc.

Further for example, the comm I/F module 252 may comprise characteristics associated with generally known or standard bus types and/or proprietary or customized bus types. Such a customized bus type may, for example, comprise various characteristics adapted to communicate information between a processor module (e.g., a baseband processor) and a radio module.

The multimode communication integrated circuit 200 is illustrated comprising a first radio module 210 adapted to communicate in a cellular communication mode, a second radio module 220 adapted to communicate in an IEEE 802.11 communication mode, a third radio module 230 adapted to communicate in an IEEE 802.15 communication mode and a fourth radio module 240 adapted to communicate in a DVB-H communication mode. Note that such combination of radio modules is merely illustrative and accordingly should not limit the scope of various aspects of the present invention.

The exemplary multimode communication integrated circuit 200 was presented to provide specific illustrations of various generally broader aspects of the present invention. Accordingly, the scope of various aspects of the present invention should not be limited by characteristics of the exemplary IC 200.

The exemplary communication integrated circuits 100, 200 were discussed in terms of various modules. The module boundaries were generally chosen for illustrative clarity and should by no means be limiting. For example, various modules may be implemented in hardware, software or a combination thereof. Additionally, various modules may share various hardware and/or software submodules. For example, a first module may share a hardware component and/or a software routine with another module. Accordingly, the scope of various aspects of the present invention should not be limited by characteristics of any particular module implementation or by arbitrary boundaries between various modules.

For illustrative clarity, the exemplary systems 100, 200 were presented and/or discussed in terms of various functional modules. Various modules may, for example, be implemented in hardware, software or a combination thereof. Also, various modules may share various sub-modules and/or sub-components. For example and without limitation, various hardware modules may share various electrical components, and various software modules may share various software subroutines. Accordingly, the scope of various aspects of the present invention should not be limited by characteristics of any particular hardware and/or software implementation or by any arbitrary boundaries between various functional modules.

Figure 3:
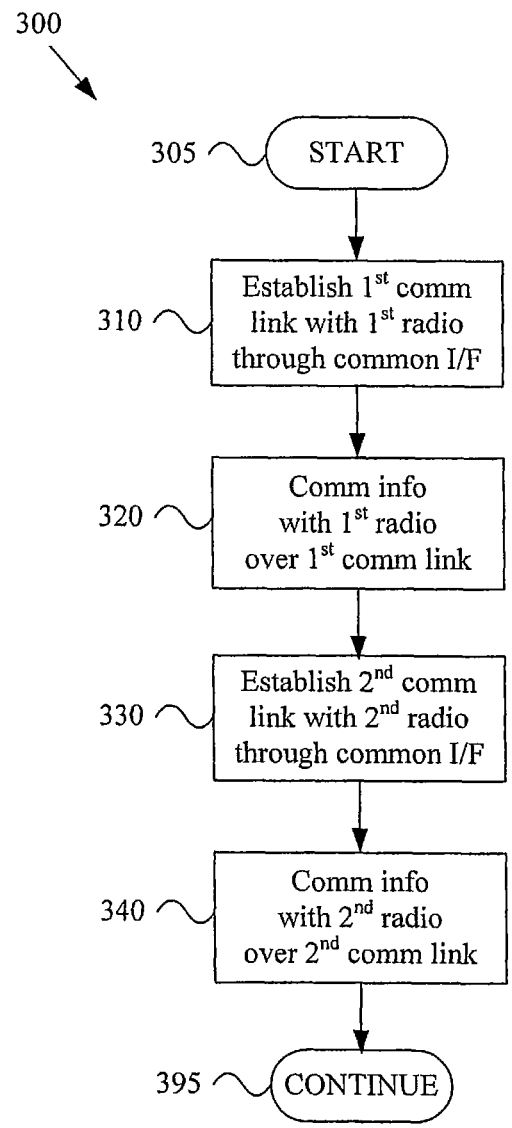
FIG. 3 is a diagram illustrating a method, in a multimode communication integrated circuit, for communicating between processor circuitry and a plurality of radio modules, in accordance with various aspects of the present invention.

FIG. 3 is a diagram illustrating a method 300, in a multimode communication integrated circuit, for communicating between processor circuitry and a plurality of radio modules, in accordance with various aspects of the present invention. The exemplary method 300 may, for example and without limitation, share various functional characteristics with the exemplary multimode communication integrated circuits 100, 200 illustrated in FIGS. 1-2 and discussed previously.

The exemplary method 300 may be implemented in any of a variety of types of multimode communication integrated circuits and in any of a variety of communication devices or systems comprising multimode capability. For example and without limitation, the exemplary method 300 may be implemented in an integrated circuit of a mobile communication device (e.g., a cellular telephone, pager, portable email device, portable computer with mobile communication capability, personal digital assistant, portable television, portable radio, etc.). Also for example, the exemplary method 300 may be implemented in an integrated circuit of a fixed communication device (e.g., a cellular base station, a satellite, a wireless router, a set top box, a portable phone base station, a television station, etc.). Accordingly, the scope of various aspects of the present invention should not be limited by characteristics of any particular type of communication device or system that may comprise an integrated circuit implementing the exemplary method 300.

The exemplary method 300 may, for example, be implemented in a multimode communication IC that comprises a plurality of radio modules (or radios). Such radio modules may, for example and without limitation, correspond to respective communication modes. In the non-limiting exemplary method 300 illustrated in FIG. 3, an integrated circuit implementing the method 300 may comprise at least a first radio module and a second radio module. The following discussion will generally refer to only two radio modules for illustrative clarity. Note, however, that the scope of various aspects of the present invention should not be limited to any particular number of radio modules.

A multimode communication IC implementing the exemplary method 300 may also comprise a processor module (e.g., a baseband processor) that is adapted to support multimode communication utilizing a plurality of radios. For example, the processor module may communicate various types of information with at least a first and second radio module. The exemplary method 300 may generally be discussed below from the perspective of such a processor module. Note however, that the scope of various aspects of the present invention should not be limited by characteristics of such an illustrative perspective. For example, various aspects of the present invention may also be implemented by radio modules, communication interface modules, or other components of a communication integrated circuit. As a non-limiting example, an exemplary scenario where a processor module communicates information to a radio module over a shared data bus may alternatively be viewed from the perspective of the radio module receiving such information.

The exemplary method 300 may begin at step 305. The exemplary method 300 (and the other exemplary methods discussed herein) may begin executing for any of a variety of reasons. For example and without limitation, the method 300 may begin executing in response to a user command to begin. Also for example, the method 300 may begin executing in response to a communication system implementing the method 300 resetting or powering up. Further for example, the method 300 may begin executing in response to the detection of another system with which a communication link may be established (e.g., detection of cell phone coverage, an Internet hot spot, a home computing appliance, etc.). Accordingly, the scope of various aspects of the present invention should not be limited by characteristics of any particular initiating cause or condition.

The exemplary method 300 may, at step 310, comprise establishing a first communication link with a first radio module (or radio) of the integrated circuit through a common communication interface ("common I/F"). Step 310 may, for example and without limitation, share various functional characteristics with the processor modules 150, 250 of the exemplary integrated circuits 100, 200 illustrated in FIGS. 1-2 and discussed previously.

Such a first radio module may, for example, comprise a communication module that is adapted to establish and communicate over a communication link (e.g., an RF communication link) associated with a particular first communication mode of a multimode communication device. Various characteristics of exemplary communication modes were presented previously with regard to the first radio module 110 of the exemplary IC 100 illustrated in FIG. 1. For example and without limitation, such a first communication mode may comprise characteristics of any of a variety of communication modes (e.g., a cellular telephone communication mode, television communication mode, peer-to-peer communication mode, any of a variety of computer (or data) network communication modes, etc.

Such a first radio module may also, for example, comprise a communication interface module that is adapted to communicate information with other modules (e.g., a baseband processing module or other radio modules). For example, in a non-limiting exemplary scenario, step 310 may comprise establishing a first communication link with the first radio module (or radio) by interfacing with such a communication interface module.

The common I/F may for example, be adapted to communicate with a plurality of radios (e.g., a first radio module and a second radio module) through a common (or shared) interface. The common I/F may comprise any of a variety of common (or shared) interface characteristics. For example, the common I/F may be adapted to communicate with a plurality of radio modules (e.g., a first radio module and a second radio module) over a common (or shared) communication bus. For example, the common I/F may be adapted to communicate with a first radio module over a shared communication bus and with a second radio module over the same shared communication bus (e.g., serially or concurrently).

The common (or shared) communication bus may comprise characteristics of any of a variety of communication bus types, non-limiting examples of which were discussed previously with regard to the exemplary common communication bus 160 of the integrated circuit 100 illustrated in FIG. 1. For example and without limitation, the common communication bus may comprise characteristics of a serial or parallel bus. Also for example, the common communication bus may comprise a single or multiple signal paths (e.g., a single conductor or multiple conductors). Also for example, the common communication bus may comprise characteristics of a generally known bus type, standard bus type or customized bus type (e.g., customized for communication of radio information). Additionally for example, the common communication bus may comprise characteristics of any of a variety of communication media or communication bus architectures. Further for example, communication over the common communication bus may comprise characteristics of any of a variety of communication protocols.

Step 310 may comprise establishing the first communication link with the first radio module through the common I/F in any of variety of manners. The manner in which step 310 establishes a communication link may, for example, depend on characteristics of the common I/F. For example, in a non-limiting exemplary scenario where the common I/F communicates asynchronously, establishing such a communication link may (but not necessarily) comprise handshaking with the first radio module (e.g., to establish addressing, communication rules, communication channels, etc.). Alternatively, for example, depending on integrated circuit architecture, such a communication link might exist whenever the integrated circuit is powered up.

In a non-limiting exemplary scenario where communication channels utilized by the common I/F are predetermined, step 310 may comprise doing nothing or, for example, pinging the first radio module to verify the communication link. In yet another non-limiting exemplary scenario, step 310 may comprise communicating information of allocated communication bandwidth. As discussed previously, and as will be discussed again later, various aspects of the present invention may comprise allocating and/or re-allocating communication bandwidth through the common interface. In such an exemplary scenario, step 310 may comprise communicating information related to allocated bandwidth with the first radio module.

In general, step 310 may comprise establishing a first communication link with a first radio module (or radio) of the integrated circuit through a common communication interface ("common I/F"). Accordingly, the scope of various aspects of the present invention should not be limited by characteristics of a particular communication interface, communication bus or manner of establishing a communication link.

The exemplary method 300 may, at step 320, comprise communicating information with the first radio module over the first communication link established at step 310 (i.e., through the common I/F). Step 320 may, for example and without limitation, share various functional characteristics with the processor modules 150, 250 of the exemplary integrated circuits 100, 200 illustrated in FIGS. 1-2 and discussed previously. Also for example, step 320 may share various functional characteristics with the first radio module 110, 210 (and/or other radio modules) of the integrated circuits 100, 200 illustrated in FIGS. 1-2 and discussed previously.

For example and without limitation, such information may comprise characteristics of any of a variety of types of information. Various non-limiting examples of such information were presented previously in the discussion of the integrated circuit 100 of FIG. 1. For example, such information may comprise communication information, radio configuration data, radio operational data, etc. Such information may comprise communication information to be transmitted by, or which was received from, the first radio module. Also for example, such information may comprise radio configuration or operational information, MAC layer information, PHY layer information, Data Link layer information, session layer information, application layer information, radio component setting information, executable instruction information, state machine information, PAL information, multimode interoperability information, etc. The scope of various aspects of the present invention should not be limited by characteristics of particular types of information.

Step 320 may comprise communicating information with the first radio module over the first communication link in any of a variety of manners. As mentioned previously, the first communication link (or, e.g., a shared communication bus) may be based on synchronous or asynchronous communication.

In a first non-limiting exemplary scenario, the common I/F may be characterized by synchronous communication. For example and without limitation, step 320 may comprise communicating the information with the first radio module utilizing synchronous communication (e.g., over a shared communication bus). For example and without limitation, step 320 may comprise communicating with the first radio module utilizing a polling technique. For example, step 320 may comprise initiating communication with the first radio module by communicating a poll message directed to the first radio module.

Also for example, step 320 may comprise communicating with the first radio module utilizing allocated channel space. Such allocated channel space may, for example, comprise a frequency, timeslot, code, hopping sequence, etc. As discussed elsewhere, such allocated channel space may, for example, be allocated at IC design or production time or may be allocated in real-time in response to real-time operating conditions. Further for example, step 320 may comprise communicating with the first radio module utilizing various token-based techniques.

In a second non-limiting exemplary scenario, the common I/F may be characterized by asynchronous communication. For example and without limitation, step 320 may comprise communicating the information with the first radio module utilizing asynchronous communication (e.g., over a shared communication bus). For example, step 320 may comprise communicating the information with the first radio module utilizing an ALOHA, CSMA or CSMA/CD medium access protocol to access a shared communication bus. Also for example, step 320 may comprise communicating addressable data packets over a shared communication bus. For example, the first module and other modules (e.g., a module of the common I/F) may comprise respective addresses to which data packets may be sent.

In general, step 320 may comprise communicating information with the first radio module over the first communication link (i.e., through the common I/F). Accordingly, the scope of various aspects of the present invention should not be limited by characteristics of any particular manner of communicating information over a communication link (e.g., over a shared communication bus).

The exemplary method 300 may, at step 330, comprise establishing a second communication link with a second radio module (or radio) of the integrated circuit through the common communication interface (i.e., the same common I/F through which the first communication link was established at step 310). Step 330 may, for example and without limitation, share various characteristics with step 310 (albeit with respect to a second communication link and a second radio module).

Step 330 may also, for example and without limitation, share various functional characteristics with the processor modules 150, 250 of the exemplary integrated circuits 100, 200 illustrated in FIGS. 1-2 and discussed previously. Also for example, step 330 may share various functional characteristics with the second radio module 120, 220 (and/or other radio modules) of the integrated circuits 100, 200 illustrated in FIGS. 1-2 and discussed previously.

For example, step 330 may comprise establishing the second communication link with the second radio module over the same communication bus (e.g., a shared communication bus) over which the first communication link was established with the first radio module at step 310. As discussed previously with regard to step 310, step 330 may, in various exemplary scenarios, comprise allocating bandwidth for communication with the second radio module.

The exemplary method 300 may, at step 340, comprise communicating information with the second radio module over the second communication link established at step 330 (i.e., through the common I/F). Step 340 may, for example and without limitation, share various characteristics with step 320 (albeit with respect to communicating with a second radio module).

Step 340 may also, for example and without limitation, share various functional characteristics with the processor modules 150, 250 of the exemplary integrated circuits 100, 200 illustrated in FIGS. 1-2 and discussed previously. Also for example, step 340 may share various functional characteristics with the second radio module 120, 220 (and/or other radio modules) of the integrated circuits 100, 200 illustrated in FIGS. 1-2 and discussed previously.

For example, as mentioned previously with regard to step 320, step 340 may comprise communicating any of a variety of information with the second radio module. Also, step 340 may comprise communicating such information with the second radio module (e.g., over a communication bus shared with the first radio module) in any of a variety of manners (e.g., including synchronous and/or asynchronous communications. Additionally, as mentioned elsewhere, step 340 may, in various exemplary scenarios, allocating bandwidth for such communication.

The exemplary method 300 may, at step 395, comprise performing continued processing. Such continued processing may comprise characteristics of any of a variety of types of continued processing. For example and without limitation, such continued processing may comprise establishing and utilizing communication links between radio modules. Such communication may, for example, comprise utilizing the common I/F or bypassing the common I/F.

Also for example, such continued processing may comprise re-allocating bandwidth in response to real-time operating conditions. For example, step 395 may comprise re-allocating communication bandwidth based, at least in part, on communications ending and/or new communications beginning. Also for example, step 395 may comprise re-allocating communication bandwidth based, at least in part, on changing noise conditions, power conditions, quality-of-service goals, etc.

Additionally, for example, such continued processing may comprise establishing communication links and communicating information with any number of additional radio modules. Such communication may, for example, comprise communicating with a third or higher-number radio module through the common interface over the shared communication bus.

In general, step 395 may comprise performing any of a large variety of continued processing activities. Accordingly, the scope of various aspects of the present invention should not be limited by characteristics of any particular type of continued processing.

The exemplary method 300 was presented to provide specific illustrations of various generally broader aspects of the present invention. Accordingly, the scope of various aspects of the present invention should not be limited by characteristics of the exemplary method 300.

Figure 4:
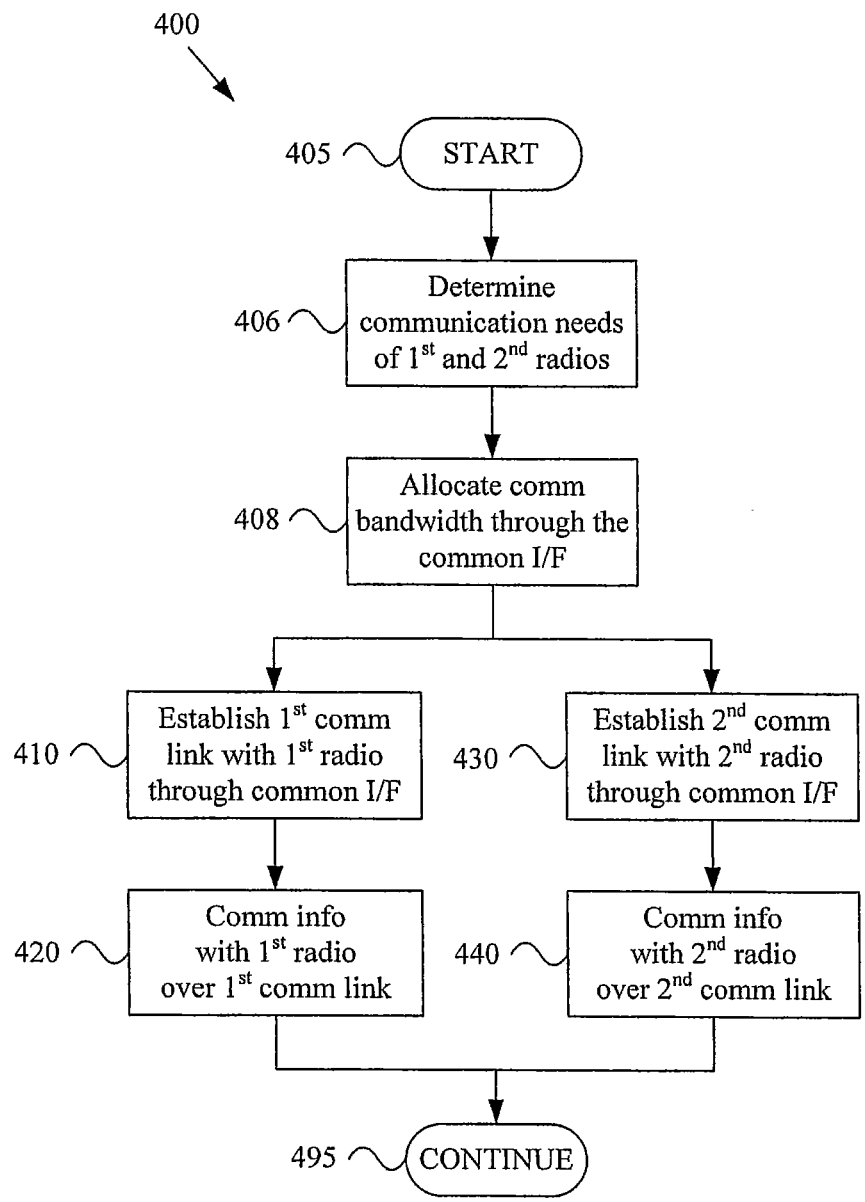
FIG. 4 is a diagram illustrating a method, in a multimode communication integrated circuit, for communicating between processor circuitry and a plurality of radio modules, in accordance with various aspects of the present invention.

FIG. 4 is a diagram illustrating a method 400, in a multi-mode communication integrated circuit, for communicating between processor circuitry and a plurality of radio modules, in accordance with various aspects of the present invention. The exemplary method 400 may, for example and without limitation, share various characteristics with the exemplary method 300 illustrated in FIG. 3 and discussed previously. Also for example, the exemplary method 400 may share various functional characteristics with the exemplary multi-mode integrated circuits 100, 200 illustrated in FIGS. 1-2 and discussed previously.

As mentioned previously, various aspects of the present invention may comprise allocating bandwidth for communication with a plurality of radio modules (or radios) through a common communication interface (e.g., over a shared communication bus). Steps 406 and 408 discussed below provide a non-limiting example of such allocation. Such bandwidth allocation is, of course, by no means to be limited by the exemplary illustration.

The exemplary method 400 may, at step 406, comprise determining communication needs of the first and second radios (or radio modules). For example and without limitation, step 406 may comprise determining Quality of Service ("QoS") associated with various radios. Also for example, step 406 may comprise determining a required and/or desired data rate associated with various radios. Further for example, step 406 may comprise determining whether various radios (e.g., associated with respective communication modes) are associated with connectionless or connection-oriented communication. Still further for example, step 406 may comprise ascertaining communication need information stored in a communication profile.

In general, step 406 may comprise determining communication needs associated with various radios. Accordingly, the scope of various aspects of the present invention should not be limited by characteristics of any particular manner of determining various communication needs.

The exemplary method 400 may, at step 408, comprise allocating communication bandwidth through a common communication interface ("common I/F") (e.g., based, at least in part, on the communication needs determined at step 406). For example and without limitation, step 408 may comprise allocating a minimum amount of common I/F bandwidth necessary to achieve respective QoS goals associated with the first and second radio modules. Such a determination may also, for example, be based on respective priority for communications utilizing the first and second radio modules.

Step 408 may also, for example, comprise allocating common I/F bandwidth based on any of a number of criteria, non-limiting examples of which were discussed previously with regard to the integrated circuit 100 illustrated in FIG. 1. For example, step 408 may comprise allocating common I/F bandwidth based, at least in part, on real-time communication conditions. Also for example, step 408 may comprise allocating common I/F bandwidth based, at least in part, on a bandwidth allocation profile (e.g., factory or user specified).

In general, step 408 may comprise allocating communication bandwidth through the common I/F. Accordingly, the scope of various aspects of the present invention should not be limited by characteristics of any particular manner of allocating communication bandwidth through a common communication interface.

The exemplary method 400 may, at steps 410 and 420, comprise establishing a first communication link with a first radio module (or first radio) through a common communication interface and communicating information with the first radio module over such communication link. Steps 410 and 420 may, for example and without limitation, share various characteristics with steps 310 and 320 of the exemplary method 300 illustrated in FIG. 3 and discussed previously. Steps 410 and 420 may, for example, comprise utilizing common I/F bandwidth allocated at step 408 for communication with the first radio module.

The exemplary method 400 may, at steps 430 and 440, comprise establishing a second communication link with a second radio module (or second radio) through the common communication interface and communicating information with the second radio module over such communication link. Steps 430 and 440 may, for example and without limitation, share various characteristics with steps 330 and 340 of the exemplary method 300 illustrated in FIG. 3 and discussed previously. Steps 430 and 440 may, for example, comprise utilizing common I/F bandwidth allocated at step 408 for communication with the second radio module.

As illustrated by the parallel paths in the flow diagram for the exemplary method 400, communication with the first radio module and the second radio module may occur concurrently. Such concurrent communication may, for example, correspond to true simultaneous communication (e.g., utilizing parallel channels of the common interface, for example, respective spread spectrum codes or respective frequencies). Alternatively for example, such concurrency may, for example, correspond to pseudo simultaneity (e.g., utilizing time division multiplexing). The scope of various aspects of the present invention should not be limited by the existence or absence of concurrent communication with the first radio module and the second radio module or by any particular type of concurrent communication.

The exemplary method 400 was generally presented to provide specific illustrations of various generally broader aspects of the present invention. Accordingly, the scope of various aspects of the present invention should not be limited by characteristics of the exemplary method 400.

In summary, various aspects of the present invention provide a multimode communication integrated circuit comprising processing circuitry (e.g., baseband processing circuitry) with a shared radio interface. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A mobile communication device comprising:
   a processor;
   a common communication interface in data communication with the processor; and
   a plurality of radio communication interface modules, wherein each respective radio communication interface module of the plurality of radio communication interface modules corresponds to a respective wireless communication technology by which the mobile communication device communicates with one or more remote radios;
   each respective radio communication interface module is operable to communicate with each other different respective radio communication interface modules of the plurality of radio communication interface modules via said common communication interface.

2. The mobile communication device of claim 1 further comprising:
   a plurality of radio communication modules, each respective radio communication module being associated with a respective radio communication interface module and being operative for radio communication with at least one of the one or more radios using a respective wireless communication technology.

3. The mobile communication device of claim 1 further comprising:
   a communication manager module operable to manage communication between said processor and the respective different radio communication interface modules.

4. The mobile communication device of claim 3 wherein the communication manager module is software programmable to manage communication according to the respective wireless communication technology by which the mobile communication device communicates with one or more remote radios.

5. The mobile communication device of claim 1 wherein the mobile communication device comprises a cellular telephone.

6. The mobile communication device of claim 5 wherein the cellular telephone comprises a multimode radiotelephone operable for data communication on a plurality of radio communication networks.

7. The mobile communication device of claim 5 wherein a first radio communication interface module is operative to initiate a call with a first remote radio using a first radio technology while a second radio communication interface module is operative to continue a call with a second remote radio using a second, different radio technology.

8. The mobile communication method of claim 7 wherein the common communication interface is operative to communicate with the first radio communication interface module prior to initiation of the call with the first remote radio and further is operative to communicate with the second radio communication interface module prior to initiation of the call with the second remote radio.

9. The mobile communication device of claim 8 wherein the processor is operative to allocate bandwidth between the call with the first remote radio and the call with the second remote radio, and wherein the processor is further operative to communicate information about allocated bandwidth through the common communication interface to the first radio communication interface module and the second radio communication interface module.

10. The mobile communication device of claim 1 wherein the mobile communication device comprises a portable computer.

11. A method comprising:
at a mobile communication device, communicating first control data between a processor and a first addressable radio module, the processor and the first addressable radio module being in data communication through a common communication interface;
at the mobile communication device, communicating second control data between the processor and a second addressable radio module, the processor and the second addressable radio module being in data communication through the common communication interface;
at the mobile communication device, communicating data between the first addressable radio module and the second addressable radio module through the common communication interface;
based on the first control data, initiating a first call between the first addressable radio module and a first remote radio using a first radio technology; and
based on the second control data, initiating a second call between the second addressable radio module and a second remote radio using a second radio technology, the second radio technology being different from the first radio technology.

12. The method of claim 11 further comprising:
sharing a common communication bus between the common communication interface and the first addressable radio module and the second addressable radio module.

13. The method of claim 11 further comprising:
communicating setting information for programmable radio components of the first addressable radio module, the second addressable radio module, or both, over a common communication bus between the common communication interface and the first addressable radio module and the second addressable radio module.

14. The method of claim 11 further comprising:
communicating interference management information to the first addressable radio module, the second addressable radio module, or both, over a common communication bus between the common communication interface and the first addressable radio module and the second addressable radio module.

15. The method of claim 11 wherein communicating first control data between a processor and a first addressable radio module and communicating second control data between the processor and a second addressable radio module comprise utilizing a polling protocol on a common communication bus linking the processor and the first addressable radio module and the second addressable radio module.

16. The method of claim 11 wherein communicating first control data between the common communication interface and a first addressable radio module and communicating second control data between the processor and a second addressable radio module comprise utilizing a contention-based medium access protocol over a common bus.

17. The method of claim 11 wherein communicating first control data between the common communication interface and a first addressable radio module and communicating second control data between the processor and a second addressable radio module comprise communicating over a common bus utilizing time slots allocated to selected respective devices on the common bus.

18. The method of claim 11 further comprising:
communicating over a common bus between the first addressable radio module and the second addressable radio module information to be communicated by the first addressable radio module to the first remote radio, and
communicating over the common bus information to be communicated by the second addressable radio module to the second remote radio.

19. The method of claim 11 wherein the mobile communication device comprises a radio telephone.

20. The method of claim 11 wherein the processor, the common communication interface, the first addressable radio module and the second addressable radio module are integrated in a common integrated circuit.

* * * * *